(12) United States Patent
Meeusen et al.

(10) Patent No.: US 11,506,093 B2
(45) Date of Patent: Nov. 22, 2022

(54) MACHINE PROVIDED WITH AN OIL PUMP AND A METHOD TO START SUCH A MACHINE

(71) Applicant: ATLAS COPCO AIRPOWER, NAAMLOZE VENNOOTSCHAP, Wilrijk (BE)

(72) Inventors: Wim Meeusen, Wilrijk (BE); Edwin Roskam, Wilrijk (BE)

(73) Assignee: ATLAS COPCO AIRPOWER, NAAMLOZE VENNOOTSCHAP, Wilrijk (BE)

( * ) Notice: Subject to any disclaimer, the term of this patent is extended or adjusted under 35 U.S.C. 154(b) by 263 days.

(21) Appl. No.: 16/628,889

(22) PCT Filed: Jul. 17, 2018

(86) PCT No.: PCT/IB2018/055280
§ 371 (c)(1),
(2) Date: Jan. 6, 2020

(87) PCT Pub. No.: WO2019/043470
PCT Pub. Date: Mar. 7, 2019

(65) Prior Publication Data
US 2020/0232355 A1 Jul. 23, 2020

Related U.S. Application Data

(60) Provisional application No. 62/551,323, filed on Aug. 29, 2017.

(30) Foreign Application Priority Data

Mar. 12, 2018 (BE) .................................. 2018/5151

(51) Int. Cl.
*F01M 1/12* (2006.01)
*F01M 1/02* (2006.01)
(Continued)

(52) U.S. Cl.
CPC ................ *F01M 1/12* (2013.01); *F01M 1/02* (2013.01); *F04C 14/06* (2013.01); *F04C 18/16* (2013.01);
(Continued)

(58) Field of Classification Search
CPC .. F01M 1/12; F01M 1/02; F04C 14/06; F04C 18/16; F04C 28/08; F04C 29/02; F16N 7/40
See application file for complete search history.

(56) References Cited

U.S. PATENT DOCUMENTS 2,417,627 A * 3/1947 Brady, Jr. ................ F04D 9/02
 415/56.4
2,490,391 A 12/1949 Wentling
(Continued)

FOREIGN PATENT DOCUMENTS

DE 38 24 398 A1 2/1989
DE 199 13 897 A1 9/1999
(Continued)

OTHER PUBLICATIONS

International Search Report for PCT/IB2018/055280 dated Oct. 18, 2018 [PCT/ISA/210].

*Primary Examiner* — Henry Y Liu
(74) *Attorney, Agent, or Firm* — Sughrue Mion, PLLC

(57) ABSTRACT

Machine provided with a machine element (2) and an oil pump (4) and a motor (3) to drive the machine element (2) and the oil pump (4), whereby the oil pump (4) is provided with a shaft (13) with a rotor (12), whereby the oil pump (4) is provided to pump oil from an oil reservoir (5) via an inlet channel (8) to nozzles that lead into the motor (3) and/or machine element (2) to lubricate and/or cool one or more bearings or other machine components, characterized in that in the inlet channel (8), near the oil pump (4) a dam (16) is provided that is higher than the height (A) of the central axis (Continued)

(18) of the shaft (13) of the oil pump (4) minus the smallest diameter (B) of the rotor (12) of the oil pump (4) divided by two.

9 Claims, 4 Drawing Sheets

(51) Int. Cl.
  *F04C 14/06* (2006.01)
  *F04C 18/16* (2006.01)
  *F04C 28/08* (2006.01)
  *F04C 29/02* (2006.01)
  *F16N 7/40* (2006.01)

(52) U.S. Cl.
  CPC .............. *F04C 28/08* (2013.01); *F04C 29/02* (2013.01); *F16N 7/40* (2013.01)

(56) References Cited

U.S. PATENT DOCUMENTS

| | | | |
|---|---|---|---|
| 3,186,630 A | | 6/1965 | Lamberton et al. |
| 6,168,391 B1 † | | 1/2001 | Ono |
| 8,936,452 B2 * | | 1/2015 | Refenius ................ F04C 2/344 |
| | | | 418/268 |
| 2002/0054822 A1 † | | 5/2002 | Watanabe |
| 2003/0059326 A1 † | | 3/2003 | Douzono |
| 2004/0112679 A1 | | 6/2004 | Centers |
| 2010/0189586 A1 † | | 7/2010 | Refenius |

FOREIGN PATENT DOCUMENTS

| | | |
|---|---|---|
| DE | 11 2015 003 048 T5 | 3/2017 |
| EP | 0 707 138 A1 | 4/1996 |
| EP | 0964159 A2 † | 12/1999 |
| EP | 2 833 000 A2 | 2/2015 |
| WO | 2009/012921 A1 | 1/2009 |

\* cited by examiner
† cited by third party

MACHINE PROVIDED WITH AN OIL PUMP AND A METHOD TO START SUCH A MACHINE

CROSS REFERENCE TO RELATED APPLICATIONS

This application is a National Stage of International Application No. PCT/IB2018/055280, filed on Jul. 17, 2018, which claims priority from U.S. Patent Provisional Application No. 62/551,323, filed on Aug. 29, 2017, and Belgian Patent Application No. 2018/5151, filed on Mar. 12, 2018.

BACKGROUND OF THE INVENTION

Field of the Invention

The present invention relates to a machine provided with an oil pump.

Background

It is known that high-speed rotating machinery, like for example oil-free screw compressors, oil-free (screw) blowers or oil-free turbo compressors, often use ball bearings and gears.

At high speeds these bearings and gears require well-dosed oil lubrication: not too much oil, which would cause hydraulic losses and even overheating, but equally not too little oil, which would cause poor lubrication and overheating.

For this reason oil jet lubrication is used, in which nozzles are used with a very precise bore which is directed to the exact location where the lubrication is needed.

The location concerned is the race track for ball bearings and the gear mesh engagement for gears.

The nozzles have to be provided with oil that has been filtered and cooled and is supplied at the right pressure. For this purpose an oil circuit is often provided in the machine, which typically comprises an oil reservoir, an oil pump, an oil cooler, an oil filter and interconnecting pipes which may or may not be integrated in other parts of the machine. Minimum pressure valves, bypasses, oil pressure sensors and temperature sensors are also often provided.

Said oil pump plays a critical role: if insufficient oil is supplied in due time to the nozzles, poor lubrication might result in damage or failure of the bearings and/or gears.

It is possible to use an oil pump that is driven by a separate motor.

The advantage of this is that the oil pump can be controlled but the disadvantage is that a separate motor and control or steering unit are required.

This is not only more expensive, it also increases the size of the machine and implies extra components that need to be maintained and can fail.

Therefore it is very interesting to use the motor that is driving the machine element to drive the oil pump as well. This guarantees that the oil pump will always run whenever the machine is running.

Suitable oil pumps are gear pumps, internal gear pumps, such as gerotor pumps and rotary vane pumps.

U.S. Pat. No. 3,995,978 describes a gerotor pump.

Such pumps can be designed to pump the right amount of oil when driven at the speed of the motor driving the machine element, by choosing an appropriate pump width, and/or number of teeth or vanes, enabling the oil pump to be mounted directly onto the shaft of the motor resulting in a very compact, robust, efficient and cost effective machine.

However, a disadvantage of such an installation whereby the oil pump is fitted directly onto the shaft of the motor, is the fact that the oil pump must then be fitted quite high in the machine, and is therefore elevated with respect to to the oil reservoir.

This means that at start-up, the oil pump must first evacuate the air from the suction tube connecting it with the oil reservoir and subsequently must suck and pump the oil from the reservoir.

This works best if there is already some oil present in the oil pump, so that when the oil pump starts, this oil is splashed around and helps to seal the gaps in the pump immediately optimising the suction power of the oil pump.

Therefore, during assembly of the oil pump, a small amount of oil is often applied to the oil pump.

However, when the pump is started for the first time a long time after its assembly, this initial amount of oil might already be partially or completely evaporated and is therefore no longer sufficient to start up the oil pump properly.

U.S. Pat. No. 3,859,013 describes an oil pump, whereby a sort of siphon-like structure is provided in the inlet pipe between the oil pump and the oil reservoir, that ensures that a small amount of oil remains trapped in the inlet pipe near the oil reservoir. However, when starting, the oil pump still needs to take in a large amount of air before the oil can be sucked out of the siphon.

The purpose of the present invention is to provide a solution to at least one of the aforementioned and other disadvantages.

SUMMARY OF THE INVENTION

The object of the present invention is a machine which is provided with a machine element and an oil pump and a motor to drive the machine element and the oil pump, whereby the oil pump is provided with a shaft with a rotor, whereby the oil pump is provided to pump oil from an oil reservoir via an inlet channel to nozzles that lead into the motor and/or the machine element to lubricate and/or cool one or more bearings or other parts of the machine, characterized in that in the inlet channel, near the oil pump a dam is provided that is higher than the height of the central axis of the shaft of the oil pump minus the smallest diameter of the rotor of the oil pump divided by two.

An advantage is that this guarantees that, once the machine is stopped, a considerable amount of oil remains in the oil pump and in the inlet channel between the oil pump and the dam so that the complete internal cavity of the oil pump can be wetted with oil when the machine is (re)started and so that the suction power of the oil pump will immediately be very high.

In this way the oil flow will be started quickly and smoothly upon (re)starting the machine.

Preferably the height of the dam is smaller than the height of the central axis of the shaft of the oil pump minus the diameter of the shaft of the oil pump divided by two.

This will prevent oil leaking via the shaft of the oil pump and/or prevent the need for additional sealing of said shaft.

The invention also concerns a method to start a machine according to the invention, characterized in that the method comprises the following steps:

pouring a less volatile lubricant than the oil in the internal cavity of the oil pump;
subsequently starting the motor.

In this way there will always be some of said lubricant present when the machine is started, so that the suction power of the oil pump is improved, the oil circuit can be started and the oil pump and inlet channel between the oil pump and the dam are filled with oil.

This is of particular advantage to guarantee a successful first start-up of the machine.

As less volatile lubricants, oil, grease or suchlike with a higher molecular weight than the oil can be used, including for example paraffin oil, vaseline, vacuum grease and suchlike.

BRIEF DESCRIPTION OF THE DRAWINGS

With the intention of better showing the characteristics of the invention, some preferred embodiments of a machine provided with an oil pump according to the invention and a method to start such a machine are described hereinafter, by way of an example without any limiting nature, with reference to the accompanying drawings, wherein.

DETAILED DESCRIPTION OF THE INVENTION

Figure 1:
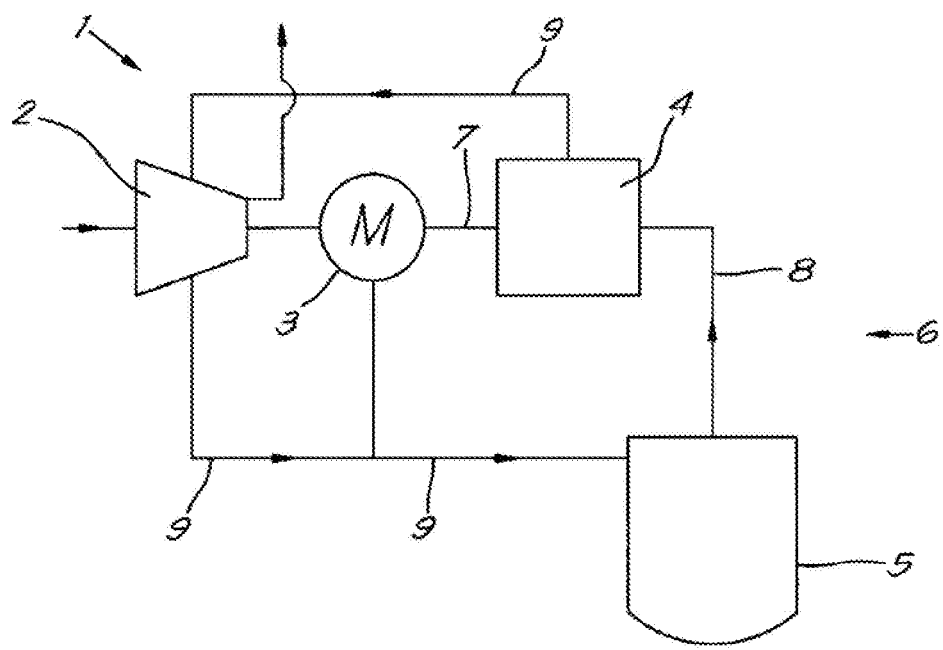
FIG. 1 schematically shows a machine according to the invention.

The machine 1 shown in FIG. 1 is in this case a compressor device 1. It is, however, not excluded that the machine 1 is a vacuum pump device or expander device.

The compressor device 1 comprises mainly a compressor element 2 for the compression of gas, a motor 3, an oil pump 4, an oil reservoir 5 and an oil circuit 6.

Figure 2:
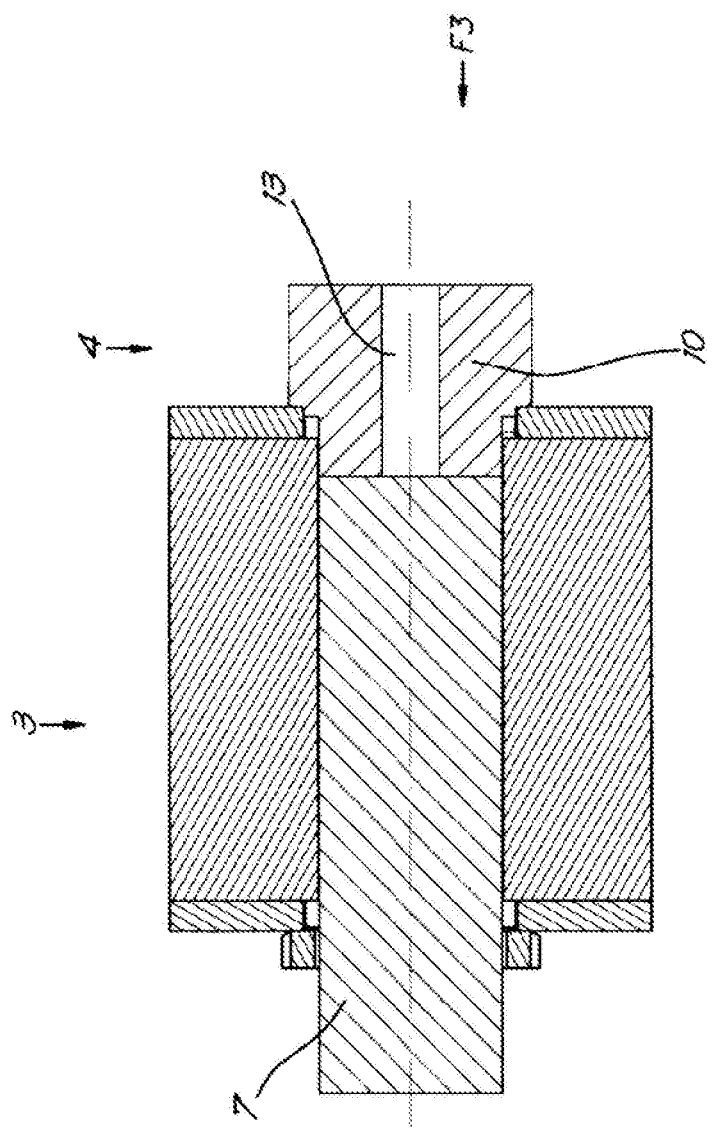
FIG. 2 schematically shows the motor and oil pump in FIG. 1 in more detail.

The motor 3 will directly drive both the compressor element 2 and the oil pump 4. FIG. 2 shows that the motor shaft 7 will be able to directly drive the oil pump 4.

The oil circuit 6 will allow the oil pump 4 to pump oil from the oil reservoir 5 via an inlet channel 8, after which the oil can be sent via the pipes 9 in the oil circuit 6 to nozzles that lead to specific locations in the motor 3 and/or the compressor element 2 for the lubrication and/or cooling of one or more bearings or other parts of the machine 1.

Given that the oil pump 4 is driven by the motor 3 of the compressor element 2, it will be located at a considerably higher level than the oil reservoir 5. This means that the inlet channel 8, which runs from the oil reservoir 5 to the oil pump 4, is relatively long.

The oil pump 4 comprises a housing 10 in which a stator 11 and a rotor 12 are attached. The rotor 12 is attached to a shaft 13, which is driven by the motor shaft 7.

The oil pump 4 is of the "gerotor" type, although this is not essential for the invention.

The housing 10 is provided with an inlet 14 for oil, to which an inlet channel 8 is connected, and with an outlet 15 for the pumped oil.

Figure 3:
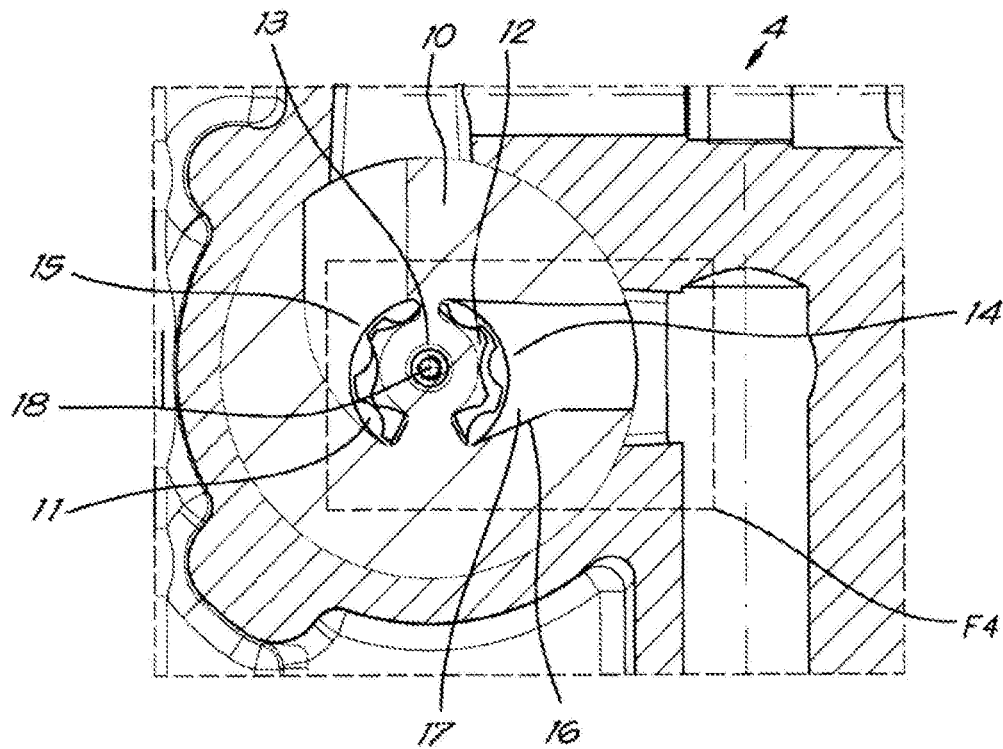
FIG. 3 shows a view according to the arrow F3 in FIG. 2, with partial cut-out of the housing of the pump.

In FIG. 3 the inlet 14 and the outlet 15 are clearly visible.

Figure 4:
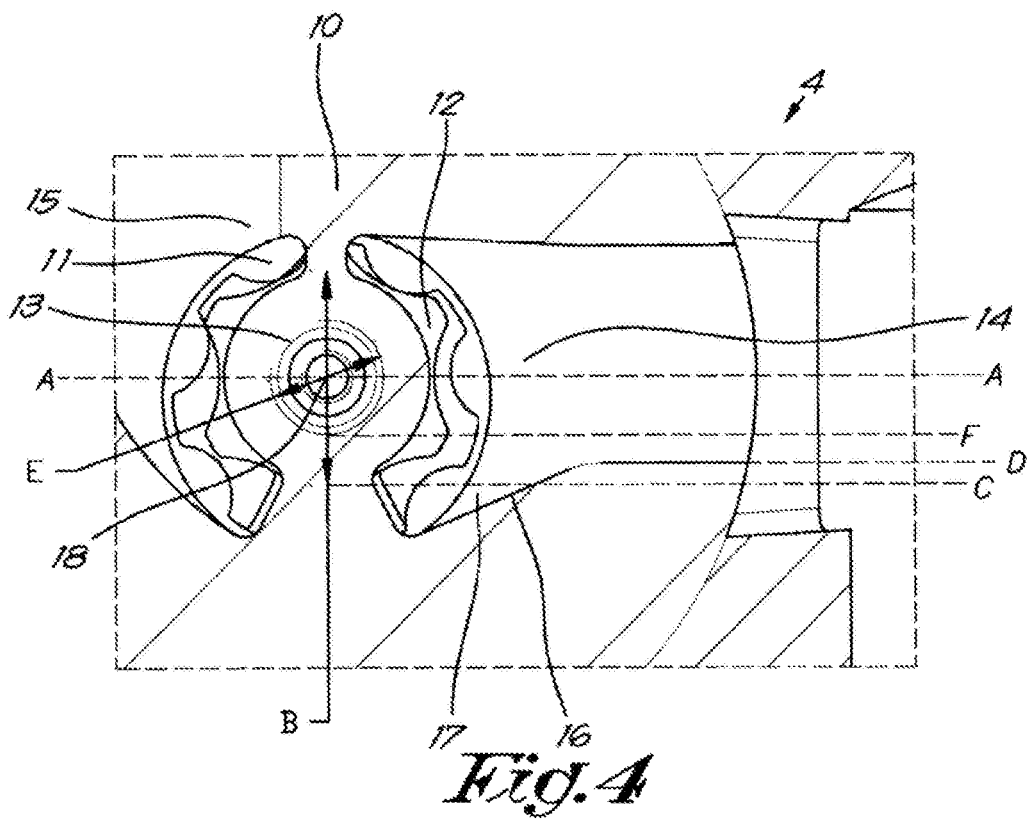
FIG. 4 shows in more detail the part that is indicated in FIG. 3 with F4.

As shown in FIG. 4 a dam 16 is provided in the inlet channel 8, near the oil pump 4.

'Dam 16' refers here to a structure that will ensure that, once the motor 3 is turned off, a certain amount of oil will remain in the cavity 17 that is closed off or isolated by the dam 16.

'Near the oil pump 4' refers here to the fact that said remaining oil will remain at a location in such a way that the oil can immediately be pumped by the oil pump 4 when the oil pump 4 is started.

This means for example that said remaining oil will at least be partly located in the oil pump 4 or that said remaining oil will be located right at the inlet 14 of the oil pump 4.

FIG. 3 also shows clearly that the dam is higher than the height A of the central axis 18 of the shaft 13 of the oil pump 4 minus half of the smallest diameter B of the rotor 12 of the oil pump 4.

By making the dam 16 at least as high as this minimum height, indicated with the line C, enough oil will remain in the cavity 17 closed off or isolated by the dam in the inlet channel 8 between the dam 16 and the oil pump 4, whereby the internal cavity of the oil pump 4 can be immediately wetted upon starting. With this immediate wetting of the internal cavity with oil, the rotor 12 and the stator 11 will become immediately sealed by this oil so that the suction power of the oil pump 4 is immediately maximised.

In this case, and preferably, the height D of the dam 16 is less than the height A of the central axis 18 of the shaft 13 of the oil pump 4 minus half the diameter E of the shaft 13 of the oil pump 4.

Should the dam 16 be higher than this maximum height, indicated with the line F, the level of the remaining oil would be higher than the bottom of the shaft 13 of the oil pump 4. This could allow oil to leak away along the shaft 13 of the oil pump 4 and/or seals would need to be provided on the shaft 13 of the oil pump 4 in order for this to be avoided.

Besides a minimum and maximum height D of the dam 16, the design of the dam 16 is in this case, and preferably, such that the volume of the oil that can be contained in the oil pump 4 and the inlet channel 8 between the oil pump 4 and the dam 16, is minimum two times the stroke volume of the oil pump 4.

The advantage of this is that there is immediately sufficient oil present in the oil pump 4 and the inlet channel 8 when starting the oil pump 4, so that not only the internal cavity can be immediately wetted, but also an amount of oil can immediately be pumped up or through the outlet 15 to the oil circuit 6 and continue to the parts of the machine 1 that require lubrication and/or cooling.

Despite the fact that the dam 16 in FIGS. 3 and 4 is designed as a slope inclining towards the rotor 12 and stator 11 of the oil pump 4, it is not excluded that the dam 16 is designed differently.

Figure 5:
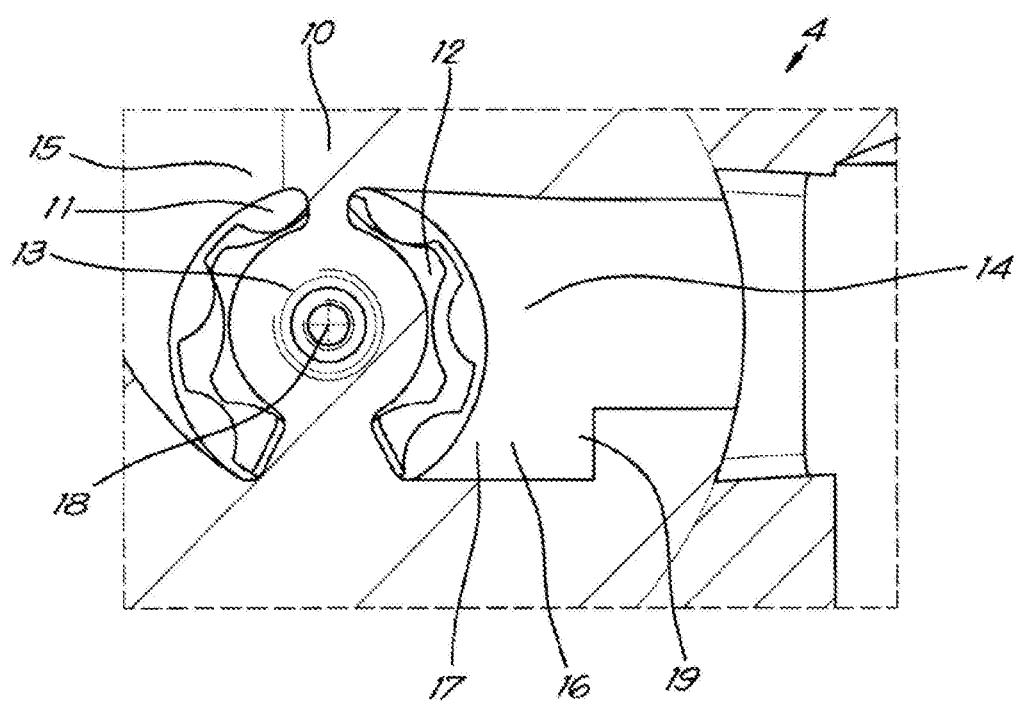
FIG. 5 shows an alternative embodiment of FIG. 4.

In FIG. 5 an alternative form is shown, whereby the dam 16 is in the form of steps, whereby a step 19 or stairs, as it were, are fitted in the inlet channel 8.

Although this embodiment has the advantage that more oil will remain in the cavity 17 between the dam 16 and the oil pump 4, it also has the disadvantage that oil can pour down as it were along the stairs 19 while being sucked up, which could cause unwanted turbulence. In the embodiment of FIGS. 3 and 4, the oil will, as it were, flow or stream downwards from the dam 16.

The operation of the machine 1 is very simple and as follows.

Before starting the machine 1, the following steps are preferably followed:

oil is poured in the oil circuit 6 downstream of the oil pump 4 and higher than the oil pump 4;

subsequently the motor 3 is started.

The poured oil can flow to the oil pump 4 and fill both the oil pump 4 and the inlet channel 8 in the cavity 17 between the dam 16 and the oil pump 4 to the level D of the dam 16.

When the motor 3 is then started the compressor element 2 and the oil pump 4 will be driven and the poured oil, which is now located in the oil pump 4 and in the said cavity 17, will ensure that the oil pump 4 can immediately pump up oil and send it through to the oil circuit 6, so that the compressor element 2 is immediately provided with the necessary oil as from the moment the machine 1 is started.

Alternatively it is also possible that a lubricant less volatile than oil is first poured in the internal cavity of the oil pump 4, before the motor 3 is started.

Such a method is preferably applied when the machine 1 is assembled, so that when the machine 1 is first started, the less volatile lubricant is present in the oil pump 4.

It is of course not excluded that both methods are combined, whereby when the machine is first started a less volatile is poured and whereby oil is poured in the oil circuit 6 when the machine 1 is subsequently restarted.

As soon as the motor 3 is started, the oil pump 4 will immediately be able to pump oil from the oil reservoir 5 via the inlet channel 8.

The pumped oil will subsequently leave the oil pump 4 via the outlet 15 and end up in the oil circuit 6 where it is sent to the various nozzles in the various components to be lubricated and/or cooled in the compressor element 2 and/or the motor 3.

The compressor element 2 will therefore be provided with oil almost immediately as from the moment the motor 3 and the machine 1 are started, thus ensuring its effective operation.

It is not excluded that the machine 1 comprises a sensor that can register whether oil is present in the cavity 17 between the oil pump 4 and the dam 16.

Said sensor can be any type of oil level sensor, but also an oil pressure sensor or oil temperature sensor according to the invention.

Before starting a machine 1 with such a sensor, the motor 3 is preferably only started after oil has been detected in the inlet channel 8 between the oil pump 4 and the dam 16.

If no oil is detected, the machine 1 is not started, but instead for example a warning signal is given to the user.

It is clear that the sensor and said method to start the machine 1 can be combined with the previously described methods. This method will add an extra safeguard in order to prevent the possibility of starting the machine 1 without oil being present in the inlet channel 8 between the oil pump 4 and the dam 16.

It is also possible that the machine 1 comprises a connection between the oil reservoir 5 and the cavity 17 between the oil pump 4 and the dam 16, whereby the connection is provided in such a way to transfer oil from the oil reservoir 5 to the cavity 17 between the oil pump 4 and the dam 16.

This can for example be achieved using a small pump that can be operated either manually or electrically.

When the machine 1 is provided with such a connection, the following method can be adopted to start the machine 1:
  oil is transferred from the oil reservoir 5 to the cavity 17 between the oil pump 4 and the dam 16.
  subsequently the motor 3 is started.

It is of course not excluded that the machine 1 is also provided with a sensor that registers whether oil is present in the inlet channel 8 between the dam 16 and the oil pump 4.

In this case upon starting, if no oil is detected, a signal will be given to the user to transfer oil from the oil reservoir 5 to the cavity 17 between the oil pump 4 and the dam 16 by operating the small pump or, if this small pump is electrical, the small pump will be automatically started by the machine 1, in order to ensure that oil is transferred from oil reservoir 5 to the cavity 17 between the oil pump 4 and the dam 16, after which the motor 3 can be started without a problem.

The present invention is by no means limited to the embodiments described as an example and shown in the drawings, but a machine provided with an oil pump and a method to start such a machine can be realised in all kinds of forms and dimensions without departing from the scope of the invention.

The invention claimed is:

1. A machine provided with a machine element (2) and an oil pump (4) and a motor (3) to drive the machine element (2) and the oil pump (4), whereby the oil pump (4) is provided with a shaft (13) with a rotor (12), whereby the oil pump (4) is provided to pump oil from an oil reservoir (5) via an inlet channel (8) to nozzles that lead into the motor (3) and/or the machine element (2) in order to lubricate and/or cool one or more bearings or other components in the machine, wherein the inlet channel (8), near the oil pump (4) a dam (16) is provided that extends to a height that is higher than the height (A) of the central axis (18) of the shaft (13) of the oil pump (4) minus the smallest diameter (B) of the rotor (12) of the oil pump (4) divided by two,
  wherein the machine (1) comprises a sensor that can register whether oil is present between the oil pump (4) and the dam (16).

2. The machine according to claim 1, wherein the height (D) of the dam (16) is smaller than the height (A) of the central axis (18) of the shaft (13) of the oil pump (4) minus the diameter (E) of the shaft of the oil pump (4) divided by two.

3. The machine according to claim 1, wherein the dam (16) is such that the volume of the oil, that can be found in the oil pump (4) and the inlet channel (8) between the oil pump (4) and the dam (16), is at least two times the stroke volume of the oil pump (4).

4. The machine according to claim 1, wherein the machine (1) comprises a connection between the oil reservoir (5) and the cavity (17) between the oil pump (4) and the dam (16), whereby the connection is configured to transfer oil from the oil reservoir (5) towards the cavity (17) between the oil pump (4) and the dam (16).

5. The machine according to claim 1, wherein the machine (1) is a compressor device, vacuum pump device or expander device.

6. A method to start a machine (1) according to claim 1, wherein the method comprises the following steps:
  pouring oil in the oil circuit (6) downstream of the oil pump (4) and higher than the oil pump (4);
  subsequently starting the motor (3).

7. A method to start a machine (1) according to claim 1, wherein the method comprises the following steps:
  pouring a less volatile lubricant than oil in the internal cavity of the oil pump (4);
  subsequently starting the motor (3).

8. A method to start a machine (1) according to claim 1, wherein the motor (3) is started after oil is detected in the inlet channel (8) between the oil pump (4) and the dam (16).

9. A method to start a machine according to claim 4, wherein the method comprises the following steps:
    transferring the oil from the oil reservoir (5) to the cavity (17) between the oil pump (4) and the dam (16);
    subsequently starting the motor (3).

\* \* \* \* \*